US012777275B2

(12) United States Patent
Ma

(10) Patent No.: US 12,777,275 B2
(45) Date of Patent: Oct. 27, 2026

(54) EARPHONE CONTROL METHOD AND APPARATUS, EARPHONE DEVICE AND STORAGE MEDIUM

(71) Applicant: GOERTEK INC., Weifang (CN)

(72) Inventor: Dongmei Ma, Weifang (CN)

(73) Assignee: GOERTEK INC., Weifang (CN)

( * ) Notice: Subject to any disclaimer, the term of this patent is extended or adjusted under 35 U.S.C. 154(b) by 121 days.

(21) Appl. No.: 18/729,022

(22) PCT Filed: Mar. 31, 2022

(86) PCT No.: PCT/CN2022/084588
§ 371 (c)(1),
(2) Date: Jul. 15, 2024

(87) PCT Pub. No.: WO2023/159715
PCT Pub. Date: Aug. 31, 2023

(65) Prior Publication Data

US 2025/0168551 A1 May 22, 2025

(30) Foreign Application Priority Data

Feb. 28, 2022 (CN) ......................... 202210192999.9

(51) Int. Cl.
*H04R 1/10* (2006.01)
*G01D 5/14* (2006.01)

(52) U.S. Cl.
CPC ............. *H04R 1/1041* (2013.01); *G01D 5/14* (2013.01); *H04R 1/1016* (2013.01)

(58) Field of Classification Search
CPC ............................ H04R 1/1041; H04R 1/1016
See application file for complete search history.

(56) References Cited

U.S. PATENT DOCUMENTS 9,294,739 B1 3/2016 Blum et al.
2017/0374448 A1* 12/2017 Patel .................... H04R 29/001
(Continued)

FOREIGN PATENT DOCUMENTS

CN 203102172 U 7/2013
CN 105212516 A 1/2016
(Continued)

OTHER PUBLICATIONS

International Search Report from International Application No. PCT/CN2022/084588 mailed Aug. 31, 2022.

*Primary Examiner* — Suhan Ni
(74) *Attorney, Agent, or Firm* — Shih IP Law Group, PLLC

(57) ABSTRACT

An earphone control method, an earphone control apparatus, an earphone device and a storage medium are disclosed. The earphone control method is applied to the earphone device, and the earphone device is provided with a magnet and a magnetic flux sensor therein, a separation distance between them is changeable by pressing the earphone device, and the method comprises: obtaining a magnetic flux value by the magnetic flux sensor (S10); and determining an operation type of a user on the earphone device according to the magnetic flux value, to control the earphone device according to the operation type (S20). Compared with a control method using a traditional key, in the earphone device control method, the implementation process using the magnetic flux sensor and the magnet is simpler, and the operation of pressing the earphone device by the user is more convenient.

10 Claims, 4 Drawing Sheets

(56) References Cited

U.S. PATENT DOCUMENTS

2018/0048953 A1* 2/2018 Park .................... H04R 1/1058
2018/0213313 A1* 7/2018 Andrikowich ......... H04R 1/083

FOREIGN PATENT DOCUMENTS

| | | | |
|---|---|---|---|
| CN | 105872874 | A | 8/2016 |
| CN | 106648245 | A | 5/2017 |
| CN | 106792307 | A | 5/2017 |
| CN | 111246085 | A | 6/2020 |
| CN | 111371446 | A | 7/2020 |
| JP | 2003116196 | A | 4/2003 |
| KR | 20170119922 | A | 10/2017 |
| WO | 2022000998 | A1 | 1/2022 |

* cited by examiner

EARPHONE CONTROL METHOD AND APPARATUS, EARPHONE DEVICE AND STORAGE MEDIUM

The present application claims a priority to the Chinese patent application No. 202210192999.9, entitled "EARPHONE CONTROL METHOD AND APPARATUS, EARPHONE DEVICE AND STORAGE MEDIUM", filed with the China Patent Office on Feb. 28, 2022, the entire contents of which are incorporated herein by reference.

TECHNICAL FIELD

The present application relates to a technical field of earphones, and in particular to an earphone control method, an earphone control apparatus, an earphone device and a storage medium.

BACKGROUND

As well known, when users use earphones to listen to music or make calls, there must be an operation method to control functions such as pausing music playback or answering and hanging up calls. With the increase of functions of the earphones, the traditional single operation key can no longer satisfy multi-functional operation needs, and setting buttons on small earphones to control various functions requires a higher implementation process, and the buttons are small and inconvenient for users to operate.

SUMMARY

A main purpose of the present application is to provide an earphone control method, an earphone control apparatus, an earphone device and a storage medium, aiming to provide the earphone control method that is different from traditional buttons and improve the user's operating experience when controlling the earphones.

In order to achieve the above purpose, the present application provides an earphone control method, which is applied to an earphone device, wherein the earphone device is provided with a magnet and a magnetic flux sensor therein, a separation distance between the magnet and the magnetic flux sensor is changeable by pressing the earphone device, and the method comprises:

Obtaining a magnetic flux value by the magnetic flux sensor; and determining an operation type of a user on the earphone device according to the magnetic flux value, to control the earphone device according to the operation type.

Optionally, the determining the operation type of the user on the earphone device according to the magnetic flux values comprises:

obtaining a reference value set currently;

counting a first duration of a state in which a difference between each of magnetic flux values continuously obtained according to a preset frequency and the reference value is greater than a first preset threshold;

if the first duration exceeds a first preset duration and is less than a second preset duration, determining that the operation type of the user on the earphone device is a click type; and if the first duration exceeds the second preset duration and is less than a third preset duration, determining that the operation type of the user on the earphone device is a long press type.

Optionally, the method further comprises:

counting a second duration of a state in which a range of each of the magnetic flux values continuously obtained according to the preset frequency is less than a second preset threshold; and if the second duration exceeds the third preset duration, setting an average value of each of the magnetic flux values whose range is less than the second preset threshold for the second duration, as a new reference value.

Optionally, the determining the operation type of the user on the earphone device according to the magnetic flux values comprises:

obtaining a preset magnetic flux range;

when the magnetic flux value is within the magnetic flux range, determining that the magnetic flux value is valid data; and determining the operation type of the user on the earphone device according to the magnetic flux value which is the valid data.

Optionally, before the obtaining the preset magnetic flux range, the method further comprises:

when it is determined that the earphone device is in an environment without external magnetic field interference and is not be pressed, obtaining an initial magnetic flux value by the magnetic flux sensor;

calculating an initial distance between the magnet and the magnetic flux sensor based on the initial magnetic flux value;

adding a preset distance change range to the initial distance to obtain a distance range; and calculating the magnetic flux range according to the distance range.

Optionally, the determining the operation type of the user on the earphone device according to the magnetic flux values comprises:

obtaining a preset magnetic flux range;

counting a third duration of a state in which each of magnetic flux values continuously obtained according to a preset frequency is within the magnetic flux range; and if the third duration exceeds a fourth preset duration, determining the operation type of the user on the earphone device according to each of the magnetic flux values that are in the magnetic flux range for the third duration.

Optionally, the obtaining the magnetic flux value by the magnetic flux sensor comprises:

gaining an original value collected by the magnetic flux sensor using a gain value and using the gained original value as the obtained magnetic flux value, wherein the gain value is obtained by calculating a ratio of a third preset threshold to an initial value, and the initial value is the original value collected by the magnetic flux sensor when the apparatus is in an environment without external magnetic field interference and is not be pressed.

In order to achieve the above purpose, the present application also provides an earphone control apparatus disposed in an earphone device, wherein the earphone device is provided with a magnet and a magnetic flux sensor, a separation distance between the magnet and the magnetic flux sensor is changeable by pressing the earphone device, and the apparatus comprises:

an obtaining module for obtaining a magnetic flux value by the magnetic flux sensor; and a determining module for determining operation type of the user on the earphone device according to the magnetic flux value, to control the earphone device according to the operation type.

In order to achieve the above purpose, the present application also provides an earphone device comprising: a memory, a processor, and an earphone control program stored in the memory and executable by the processor, wherein the earphone control program, when executed by the processor, implements steps of the earphone control method as described above.

Furthermore, in order to achieve the above purpose, the present application also provides a computer-readable storage medium, in which an earphone control program is stored, the earphone control program, when executed by a processor, implements steps of the earphone control method as described above.

In the present application, the magnet and the magnetic flux sensor are provided in the earphone device, the separation distance between the magnet and the magnetic flux sensor is changeable by pressing the earphone device, the magnetic flux value is obtained by the magnetic flux sensor, and the operation type of the user on the earphone device is determined according to the magnetic flux value, to control the earphone according to the operation type. Thus, a new earphone device control method is provided. Compared with a control method using a traditional key, in the present application, the implementation process using the magnetic flux sensor and the magnet is simpler, and the operation of pressing the earphone device by the user is more convenient.

The realization of the purpose, functional features and advantages of the present application will be further described with reference to the embodiments and the accompanying drawings.

DETAILED DESCRIPTIONS

It should be understood that the specific embodiments described herein are only used to explain the present application and are not used to limit the present application.

Figure 1:
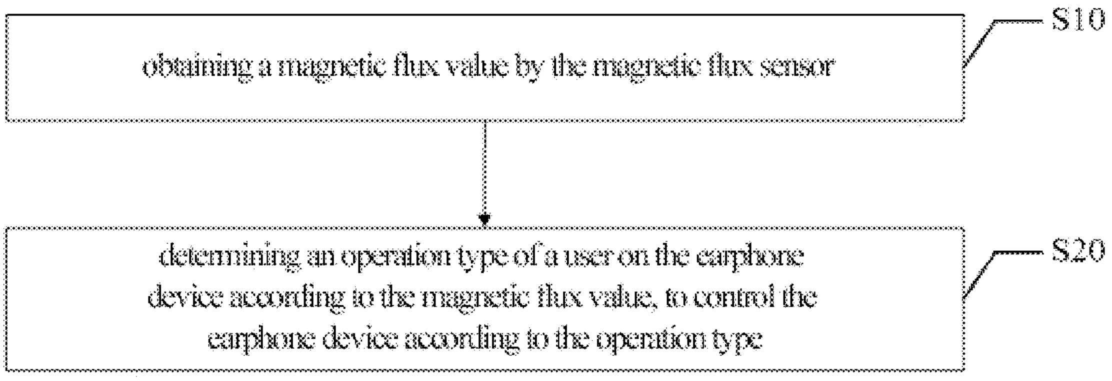
FIG. 1 is a schematic flow diagram of a first embodiment of the earphone control method of the present application.

Referring to FIG. 1, FIG. 1 is a schematic flow diagram of a first embodiment of the earphone control method of the present application.

The embodiment of the present application provides an embodiment of the earphone control method. It should be noted that although the logical sequence is shown in the flow diagram, in some cases, the shown or described steps may be executed in a sequence different from here. The earphone control method in the embodiment of the present application is applied to the earphone device, the earphone device is provided with a magnet and a magnetic flux sensor therein, a separation distance between the magnet and the magnetic flux sensor is changeable by pressing the earphone device. In this embodiment, the earphone control method comprises:

Step S10, obtaining a magnetic flux value by the magnetic flux sensor;

In this embodiment, an earphone control method for sensing magnetic flux is proposed. The principle that the magnetic flux sensor can sense the magnetic flux of the surrounding environment is used. The magnet and the magnetic flux sensor are provided in the earphone device, and the separation distance between the magnet and the magnetic flux sensor is changeable by pressing the earphone device. When the user presses the earphone device, the magnetic flux sensor on the earphone device moves away from or close to the magnet, so that the magnetic flux sensed by the magnetic flux sensor changes. According to the change of the magnetic flux, different operation types of the user, such as a short press, a long press, a double press, etc., are identified, and the earphone device is controlled based on the identified operation type.

Figure 2:
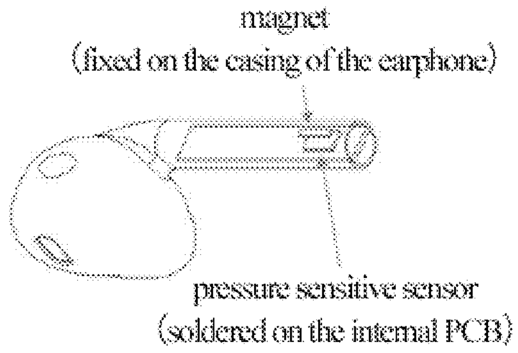
FIG. 2 is a schematic diagram of the installation positions of the magnet and the magnetic flux sensor in the earphone device according to an embodiment of the present application.

Specifically, this embodiment does not limit the locations and setting methods of the magnet and the magnetic flux sensor in the earphone device, as long as the locations and setting methods can make the distance between the magnet and the magnetic flux sensor changes when the earphone device is pressed. The magnet may be a ferromagnet or other material or apparatus capable of generating a magnetic field, which is not limited in this embodiment. Depending on the locations of the magnet and the magnetic flux sensor, pressing the earphone device may specifically refer to pressing the casing of the earphone device or pressing the magnet or the magnetic flux sensor adhered or embedded on the casing of the earphone device. The specific pressing positions are not limited in this embodiment. For example, in one embodiment, as shown in FIG. 2, the magnetic flux sensor is directly attached to the motherboard, and the magnet is adhered on the casing of the earphone device. When the user presses the casing of the earphone device, the casing of the earphone device will undergo slight deformation, which causes the magnet to move away from or approach the sensor, resulting in a change in the magnetic flux. In another embodiment, the magnetic flux sensor and the magnet can be connected by a spring and then embedded in the housing of the earphone device. By pressing the magnetic flux sensor or the magnet exposed on the housing, the spring is deformed, causing the magnet to move away or approach the sensor.

When the earphone device is in use, such as when it is powered on or connected to the user terminal through a wired or wireless method, the magnetic flux value can be obtained by the magnetic flux sensor. In a specific implementation, the obtained magnetic flux value may be an original value collected by a magnetic flux sensor, or may be a value obtained by processing the collected original value. The processing of the original value may comprise a gain processing or a noise removal processing, etc., and is not limited herein.

In a specific embodiment, the magnetic flux value obtained by the magnetic flux sensor may be obtained according to a certain frequency, for example, once every 50 ms. The frequency can be preset as needed. For example, when the power saving requirement of the earphone device is high, the frequency can be set slower; and when the operating sensitivity requirement of the earphone device is high, the frequency can be set faster. Specifically, the set value is not limited in this embodiment.

Further, in one embodiment, obtaining the magnetic flux value by the magnetic flux sensor specifically comprises:

gaining an original value collected by the magnetic flux sensor using a gain value and using the gained original value as the obtained magnetic flux value, wherein the gain value is obtained by calculating a ratio of a third preset threshold to an initial value, and the initial value is the original value collected by the magnetic flux sensor when the apparatus is in an environment without external magnetic field interference and is not be pressed.

Specifically, the gaining the original value using the gain value may be multiplying the original value by the gain value to obtain the gained magnetic flux value. After the earphone device is turned on for the first time, the user is reminded through voice to place the earphone device in an environment without external magnetic field interference and is not be pressed. When it is determined that the earphone device is in the environment without external magnetic field interference and is not be pressed, the magnetic flux sensor collects the original value which is used as the initial value to calculate the gain value. That is, the gain value is obtained by dividing the third preset threshold by the initial value. The third preset threshold can be set based on experience. For example, if it is set to 8000 and the initial value is Magnetic, then the calculated gain value is 8000/Magnetic.

In order to prevent the original value collected by the magnetic flux sensor from being too small to facilitate the calculation, the gain value can be calculated and used to gain the original value collected by the magnetic flux sensor as the obtained magnetic flux value to participate in subsequent processing and calculations.

Step S20: determining an operation type of a user on the earphone device according to the magnetic flux value, to control the earphone device according to the operation type.

After obtaining the magnetic flux value, the earphone device can determine the operation type of the user on the earphone device based on the magnetic flux value. The operation type may comprise a click type, a long press type, etc., or the click type may be further divided into a single click type, a double click type, etc. In specific implementations, there are many ways to determine the operation type of the user on the earphone device based on the magnetic flux value, which are not limited herein. For example, in one embodiment, the obtained magnetic flux value can be compared with a preset threshold. If all the obtained magnetic flux values are greater than the threshold for a certain period of time, the operation type can be considered to be the long press type.

The specific control content of controlling the earphone device according to the operation type is related to the current working scenario of the earphone device. For example, if the earphone device is currently in a call scenario, and the earphone device is preset to end the call when a long press type operation is detected, then the earphone device ends the current call when it is determined that the operation type of the user on the earphone device is the long press in the call scenario.

In this embodiment, by providing the magnet and the magnetic flux sensor in the earphone device, the separation distance between the magnet and the magnetic flux sensor is changeable by pressing the earphone device, the magnetic flux value is obtained by the magnetic flux sensor, and the operation type of the user on the earphone device is determined based on the magnetic flux values, to control the earphone according to the operation type. Thus, a new earphone device control method is provided. Compared with a control method using a traditional key, in the embodiment, the implementation process using the magnetic flux sensor and the magnet is simpler, and the operation of pressing the earphone device by the user is more convenient.

Further, based on the above-mentioned first embodiment, a second embodiment of the earphone control method of the present application is proposed. In this embodiment, step S20 comprises:

Step S201, obtaining a reference value set currently;

In this embodiment, the operation type in the earphone device can be divided into click type and a long press type. After obtaining a magnetic flux value, the reference value set currently in the earphone device can be obtained to compare the magnetic flux value with the reference value set currently. The reference value may be a value set in the earphone device based on experience in advance to represent the magnetic flux value that the earphone device can obtain using the magnetic flux sensor is not be pressed.

Step S202, counting a first duration of a state in which a difference between each of magnetic flux values continuously obtained according to a preset frequency and the reference value is greater than a first preset threshold;

The differences between the obtained magnetic flux values and the reference value set currently are calculated, that is, the reference value is subtracted from the magnetic flux values to get the differences. If the results are negative numbers, the absolute values can be taken. The earphone device obtains the magnetic flux values according to the preset frequency. Each time a magnetic flux value is obtained, a difference is calculated. The calculated difference is compared with the first preset threshold to determine whether the difference is greater than the first preset threshold, and the duration of the state in which the difference between each of the magnetic flux values continuously obtained and the reference value are greater than the first preset threshold is counted, and the statistical duration is recorded as the first duration. For example, when the preset frequency is once per 50 ms, and the differences between the 20 magnetic flux values obtained within one second and the reference value are all greater than the first preset threshold, then the statistically obtained first duration is 1 second.

The first preset threshold can be set as needed. When the difference is greater than the first preset threshold, it means that the earphone device is pressed. When the first preset threshold is set smaller, the sensitivity of the earphone device in detecting being pressed is very high. In order to prevent the user's touch operation on the earphone device from accidentally triggering the control operation on the earphone device, the first preset threshold can be set slightly greater.

Figure 3:
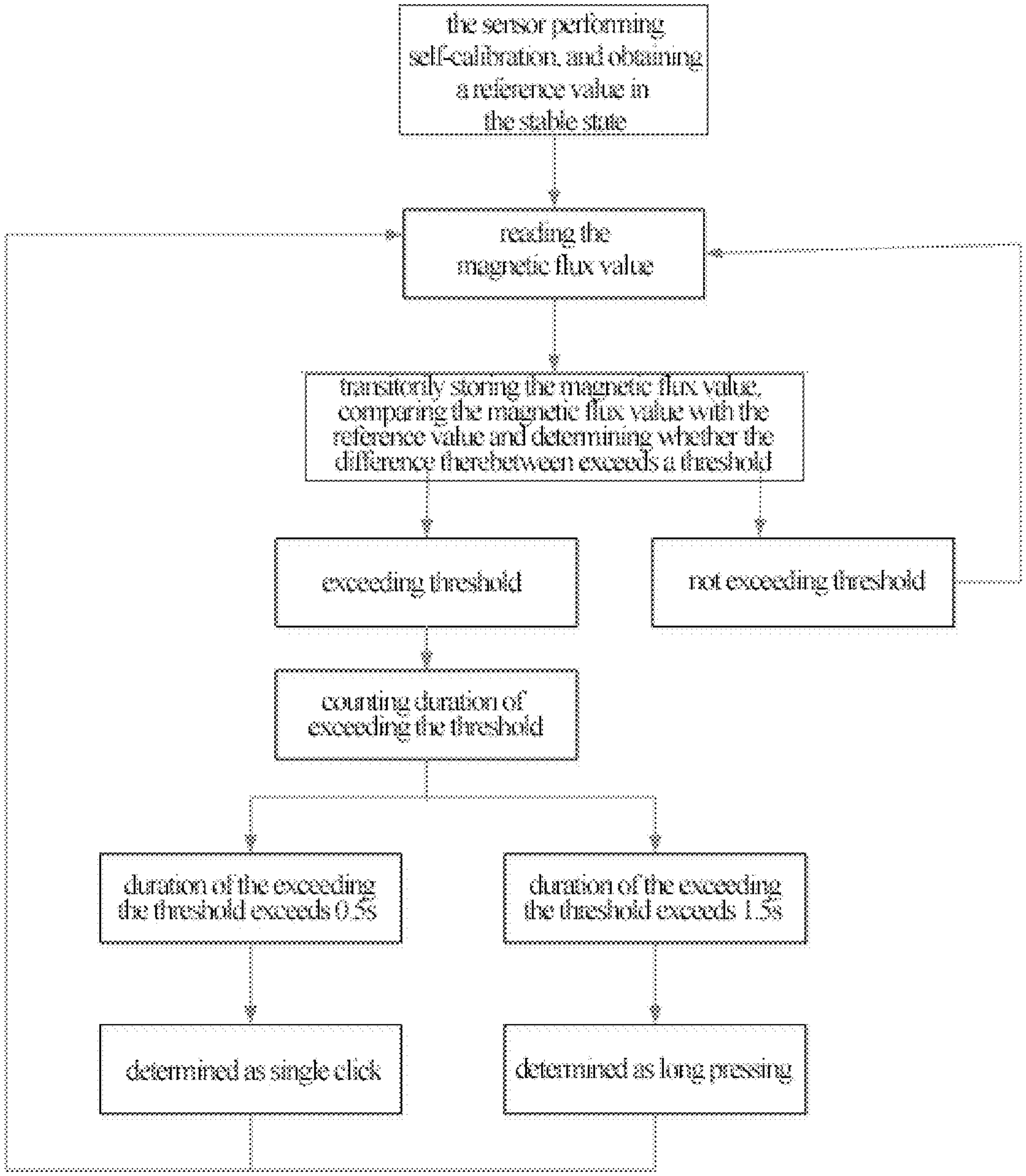
FIG. 3 is a schematic flow diagram for identifying an earphone device operation type according to an embodiment of the present application.

Step S203, if the first duration exceeds a first preset duration and is less than a second preset duration, determining that the operation type of the user on the earphone device is a click type;

If the first duration exceeds the first preset duration and is less than the second preset duration, the earphone device may determine that the operation type of the user on the earphone device is a click operation. The first preset duration and the second preset duration can be set as needed, and the first preset duration is set to be less than the second preset duration. For example, as shown in FIG. 3, the first preset duration is set to 0.5 seconds, and the second preset duration is set to 1.5 seconds. That is, when the difference between the magnetic flux value and the reference value is greater than the first preset threshold, it indicates that the earphone device is pressed and then when this state lasts for 0.5 seconds to less than 1.5 seconds, it means that the user pressed the earphone device for a short time, and the pressing operation can be determined as a click-type operation.

Further, in one embodiment, a timestamp can be recorded for the identified click-type operation, for example, the obtained time of the last magnetic flux value whose difference from the reference value is greater than the threshold is used as the occurrence time of the click-type operation. When two click-type operations whose occurrence time interval is less than a certain period of time are detected, it can be determined that the two click-type operations constitute a double-click operation; when a next click-type operation of a click-type operation is not recognized for a certain period of time after its occurrence time, the click-type operation can be determined to be a single click operation.

Step S204: if the first duration exceeds the second preset duration and is less than a third preset duration, determining that the operation type of the user on the earphone device is a long press type.

If the first duration exceeds the second preset duration and is less than the third preset duration, the earphone device can determine that the operation type of the user on the earphone device is a click operation. The third preset duration can be set as needed, and the third preset duration is set to be greater than the second preset duration. For example, as shown in FIG. 3, the second preset duration is set to 1.5 seconds, and the third preset duration is set to 3 seconds. That is, when the difference between the magnetic flux value and the reference value is greater than the first preset threshold, it indicates that the earphone device is pressed, and when this state lasts for 1.5 seconds to less than 3 seconds, it indicates that the user has pressed the earphone device for a long time, and the pressing operation can be determined as a long press type operation.

Further, if the first duration exceeds the third preset duration, it may be that the earphone device is in an abnormal state, for example, it is pressed by other objects for a long time, or the shell of the earphone device is damaged, etc. In this case, the earphone device can determine that the user has not operated the earphone device or the operation type is null, and no processing is performed. Alternatively, the earphone device can also report an error prompt.

Further, in one embodiment, the method further comprises:

Step S30, counting a second duration of a state in which a range of each of the magnetic flux values continuously obtained according to the preset frequency is less than a second preset threshold;

Since there are individual differences in the production and use of the earphone device, for example, due to long-term use of the earphone device, the irrecoverable deformation of the case may cause the distance between the magnet and the magnetic flux sensor to be less than the factory distance, so in the specific implementation, the reference value set in the earphone device can also be set in real time based on the magnetic flux value actually obtained by the earphone device.

Specifically, the earphone device can count the duration of the state in which the range of each of the magnetic flux values continuously obtained according to the preset frequency is less than the second preset threshold to obtain the second duration. That is, the range between each of the magnetic flux values continuously obtained according to the preset frequency is calculated. When a calculated range is less than the second preset threshold, timing is performed. Each time a new magnetic flux value is obtained, the range is recalculated with each of the old magnetic flux values whose range is less than the second preset threshold. When the recalculated range is still less than the second preset threshold, the timing continues. When the recalculated range is not less than the second preset threshold, the timing is stopped, and the second duration is obtained.

Step S40, if the second duration exceeds the third preset duration, setting an average value of each of the magnetic flux values whose range is less than the second preset threshold for the second duration as a new reference value.

If the second duration exceeds the third preset duration, the earphone device may set the average value of each of the magnetic flux values whose range is less than the second preset threshold for the second duration as a new reference value. The third preset duration can be set as needed. When the second duration of the state in which the range of each of the magnetic flux values continuously obtained according to the preset frequency is less than the second preset threshold exceeds the third preset duration, it means that the magnetic flux values obtained by the magnetic flux sensor tends to be stable for a long time and does not change much. It can be considered as the magnetic flux value that the earphone device can obtain when it is not pressed. At this time, the average value of the magnetic flux values that tends to be stable is set as the new reference value, which can improve the detection accuracy of the earphone device for the user's pressing operation.

Further, based on the above first and/or second embodiment, a third embodiment of the earphone control method of the present application is proposed. In this embodiment, Step S20 comprises:

Step S205, obtaining a preset magnetic flux range;

In this embodiment, in order to avoid inaccurate detection of the user's operation caused by the inaccurate magnetic flux (superimposed with the external magnetic field) obtained by the magnetic flux sensor when the earphone device is interfered by an external magnetic field (a magnetic field generated by a magnet other than the magnet in the earphone device), in this embodiment, a magnetic flux range can be set, and magnetic flux values that are not within the magnetic flux range are excluded to avoid inaccurate detection of user's operation caused by inaccurate magnetic flux detection.

The magnetic flux range can be preset in the earphone device. The maximum value of the magnetic flux range can represent the magnetic flux value obtained by the magnetic flux sensor when the user presses the earphone device with maximum force in an environment without external magnetic field interference and is not be pressed. When the maximum value is exceeded, it indicates that there is an external magnetic field interference. The minimum value of the magnetic flux range can be 0 or greater than 0. When set to a larger value, it can be used to prevent the user's touch action from accidentally triggering the control operation of the earphone device.

Step S206, when the magnetic flux value is within the magnetic flux range, determining that the magnetic flux value is valid data;

Step S207: determining the operation type of the user on the earphone device according to the magnetic flux value which is the valid data.

After obtaining the magnetic flux value, the earphone device can compare the magnetic flux value with the magnetic flux range to determine whether the magnetic flux value is within the magnetic flux range. If the magnetic flux value is within the magnetic flux range, it can be determined that the magnetic flux value is the valid data, and the magnetic flux value can be used to determine the operation type of the user.

Further, in one embodiment, the method further comprises:

Step S50, when it is determined that the earphone device is in an environment without external magnetic field interference and is not be pressed, obtaining an initial magnetic flux value by the magnetic flux sensor;

In a specific implementation, since there are individual differences in the production process and use of the earphone device, the magnetic flux range can also be set according to the magnetic flux value actually obtained by the earphone device.

Specifically, when it is determined that the earphone device is in an environment without external magnetic field interference and is not be pressed, the earphone device obtains the magnetic flux value (hereinafter referred to as the initial magnetic flux value to illustrate the distinction) by the magnetic flux sensor. Among them, the earphone device can output a prompt message to prompt the user to place the earphone device in the environment without external magnetic field interference and is not be pressed. When the magnetic flux value obtained by the magnetic flux sensor tends to be stable after outputting the prompt message, it can be determined that the earphone device is in the environment without external magnetic field interference and is not be pressed.

Step S60, calculating an initial distance between the magnet and the magnetic flux sensor based on the initial magnetic flux value;

The earphone device can calculate the initial distance between the magnet and the magnetic flux sensor based on the initial magnetic flux. The distance calculated based on the magnetic flux value can be calculated according to a preset conversion formula between the magnetic flux value and the distance, which is not limited herein.

Step S70, adding a preset distance change range to the initial distance to obtain a distance range;

After the initial distance is calculated, a preset distance range can be added to the initial distance to obtain a distance range. For example, if the initial distance is 0.5 cm and the distance change range is 10 μm to 20 μm, then the distance range is 0.5 cm+10 μm to 0.5 cm+20 μm. Among them, 10 μm is set to avoid the minimum change limit to avoid false triggering by the user, that is, only when the distance change is greater than 10 μm, is it considered that the user is pressing the earphone device.

Step S80: calculating the magnetic flux range according to the distance range.

After the distance range is calculated, the magnetic flux range can be calculated according to the distance range. Specifically, the minimum value of the magnetic flux range can be calculated according to the conversion formula between the magnetic flux value and the distance based on the minimum value of the distance range, and the maximum value of the magnetic flux range can be calculated according to the conversion formula between the magnetic flux value and the distance based on the maximum value of the distance range.

Further, in one embodiment, step S20 comprises:

Step S208, obtaining a preset magnetic flux range;

In order to avoid inaccurate detection of the user's operation caused by an inaccurate magnetic flux (superimposed with the external magnetic field) obtained by the magnetic flux sensor when the earphone device is interfered by an external magnetic field (the magnetic field generated by magnets other than the magnets in the earphone device), in one embodiment, the earphone device may also use the obtained magnetic flux value to determine the type of user's operation on the earphone device only when the magnetic flux values obtained for a period of time are all within the magnetic flux range.

Specifically, the earphone device can obtain the magnetic flux range, and the magnetic flux range can be preset in the earphone device, or can be set according to the magnetic flux values actually obtained by the earphone device.

Step S209, counting a third duration of a state in which each of magnetic flux values continuously obtained according to a preset frequency is within the magnetic flux range;

The earphone device can count the duration in which each of the magnetic flux values continuously obtained according to the preset frequency is within the magnetic flux range, and record it as the third duration. That is to say, the earphone device starts timing when it detects that a magnetic flux value is in the magnetic flux range. Each time it obtains a new magnetic flux value, it determines whether the magnetic flux value is in the magnetic flux range. If it is in the magnetic flux range, it continues to time. If it is not in the magnetic flux range, the timing stops.

Step S2010, if the third duration exceeds a fourth preset duration, determining the operation type of the user on the earphone device according to each of the magnetic flux values that are in the magnetic flux range for the third duration.

If the third duration exceeds the fourth preset duration, the earphone device may determine the operation type of the user on the earphone device according to each of the magnetic flux values that are in the magnetic flux range for the third duration. The fourth preset duration can be set as needed, for example, set to 1 second.

If the third duration does not exceed the fourth preset duration, the earphone device may determine each of the magnetic flux value as invalid data and do not process it.

Furthermore, in one embodiment, when the magnetic flux value obtained by the earphone device is greater than the maximum value in the magnetic flux range, the earphone device can also filter out, through an algorithm, part of the magnetic fluxes generated by the external magnetic field from the magnetic flux values. Specifically, a magnetic flux sensor can be installed in a user terminal such as a smartphone. When a magnetic flux value obtained by the earphone device is greater than the maximum value of the magnetic flux range, the earphone device can obtain the magnetic flux value obtained by the magnetic flux sensor in the user terminal connected to the earphone device. The magnetic flux value obtained by the magnetic flux sensor in the user terminal is subtracted from the magnetic flux values obtained by the magnetic flux sensor in the earphone device, and the operation type of the user on the earphone device is determined based on the calculation result.

Figure 4:
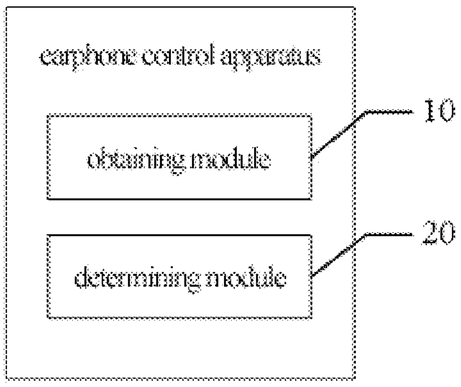
FIG. 4 is a schematic diagram of a functional module of a preferred embodiment of the earphone control apparatus of the present application.

In addition, the embodiment of the present application also proposes an earphone control apparatus, control apparatus disposed in the earphone device, wherein the earphone device is provided with a magnet and a magnetic flux sensor, a separation distance between the magnet and the magnetic flux sensor is changeable by pressing the earphone device. Referring to FIG. 4, the apparatus comprises:

- an obtaining module 10 for obtaining a magnetic flux value by the magnetic flux sensor; and
- a determining module 20 for determining an operation type of a user on the earphone device according to the magnetic flux values, to control the earphone device according to the operation type.

Further, the determining module 20 is also used to:

obtain a reference value set currently;

count a first duration of a state in which a difference between each of magnetic flux values continuously obtained according to a preset frequency and the reference value is greater than a first preset threshold;

if the first duration exceeds a first preset duration and is less than a second preset duration, determine that the operation type of the user on the earphone device is a click type; and if the first duration exceeds the second preset duration and is less than a third preset duration, determine that the operation type of the user on the earphone device is a long press type.

Furthermore, the apparatus also comprises:

a statistics module for counting a second duration of a state in which a range of each of the magnetic flux values continuously obtained according to the preset frequency is less than a second preset threshold; and a setting module for, if the second duration exceeds the third preset duration, setting an average value of each of the magnetic flux values whose range is less than the second preset threshold for the second duration as a new reference value.

Further, the determining module 20 is also used to:

obtain a preset magnetic flux range;

when the magnetic flux value is within the magnetic flux range, determine that the magnetic flux value is valid data; and determine the operation type of the user on the earphone device according to the magnetic flux value which is the valid data.

Further, the obtaining module 10 is also used to:

when it is determined that the earphone device is in an environment without external magnetic field interference and is not be pressed, obtaining an initial magnetic flux value by the magnetic flux sensor.

The apparatus also comprises:

a calculation module for calculating an initial distance between the magnet and the magnetic flux sensor based on the initial magnetic flux value; adding a preset distance change range to the initial distance to obtain a distance range; and calculating the magnetic flux range according to the distance range.

Further, the determining module 20 is also used to:

obtain a preset magnetic flux range;

count a third duration of a state in which each of magnetic flux values continuously obtained according to a preset frequency is within the magnetic flux range; and if the third duration exceeds a fourth preset duration, determine the operation type of the user on the earphone device according to each of the magnetic flux values that are in the magnetic flux range for the third duration.

Further, the obtaining module 10 is also used to:

gain an original value collected by the magnetic flux sensor using a gain value and use the gained original value as the obtained magnetic flux value, wherein the gain value is obtained by calculating a ratio of a third preset threshold to an initial value, and the initial value is the original value collected by the magnetic flux sensor when the apparatus is in an environment without external magnetic field interference and is not be pressed.

The detailed contents of the specific implementations of the earphone control apparatus of the present application are basically the same as the above embodiments of the earphone control method, and will not be described again here.

The earphone device of the present application comprises a structural case, a communication module, a main control module (such as a microcontroller unit (MCU)), a speaker, a microphone, a memory, etc. The earphone device is provided with a magnet and a magnetic flux sensor, a separation distance between the magnet and the magnetic flux sensor is changeable by pressing the earphone device. The main control module may comprise a microprocessor, an audio decoding unit, a power supply and a power management unit, sensors required by the system, and other active or passive devices (which can be replaced, deleted or added according to actual functions) to realize the reception and playback functions of wireless audio. The earphone device can establish a communication connection with the user terminal by the communication module. The memory of the earphone device may store an earphone control program, and the microprocessor can be used to call the earphone control program stored in the memory and perform the following operations:

obtaining a magnetic flux value by the magnetic flux sensor; and determining an operation type of a user on the earphone device according to the magnetic flux value, to control the earphone device according to the operation type.

Further, the operation of determining the operation type of the user on the earphone device according to the magnetic flux values comprises:

obtaining a reference value set currently;

counting a first duration of a state in which a difference between each of the magnetic flux values continuously obtained according to a preset frequency and the reference value is greater than a first preset threshold;

if the first duration exceeds a first preset duration and is less than a second preset duration, determining that the operation type of the user on the earphone device is a click type; and if the first duration exceeds the second preset duration and is less than a third preset duration, determining that the operation type of the user on the earphone device is a long press type.

Further, the microprocessor can also be used to call the earphone control program stored in the memory and perform the following operations:

counting a second duration of a state in which a range of each of the magnetic flux values continuously obtained according to the preset frequency is less than a second preset threshold; and if the second duration exceeds the third preset duration, setting an average value of each of the magnetic flux values whose range is less than the second preset threshold for the second duration, as a new reference value.

Further, the operation of determining the operation type of the user on the earphone device according to the magnetic flux values comprises:

obtaining a preset magnetic flux range;

when the magnetic flux value is within the magnetic flux range, determining that the magnetic flux value is valid data; and determining the operation type of the user on the earphone device according to the magnetic flux value which is the valid data.

Further, before obtaining the preset magnetic flux range, the microprocessor can also be used to call the earphone control program stored in the memory and perform the following operations:

when it is determined that the earphone device is in an environment without external magnetic field interference and is not be pressed, obtaining an initial magnetic flux value by the magnetic flux sensor;

calculating an initial distance between the magnet and the magnetic flux sensor based on the initial magnetic flux value;

adding a preset distance change range to the initial distance to obtain a distance range; and calculating the magnetic flux range according to the distance range.

Further, the operation of determining the operation type of the user on the earphone device according to the magnetic flux values comprises:

obtaining a preset magnetic flux range;

counting a third duration of a state in which each of magnetic flux values continuously obtained according to a preset frequency is within the magnetic flux range;

if the third duration exceeds a fourth preset duration, determining the operation type of the user on the earphone device according to each of the magnetic flux values that are in the magnetic flux range for the third duration.

Further, the obtaining the magnetic flux value by the magnetic flux sensor specifically comprises:

gaining an original value collected by the magnetic flux sensor using a gain value and using the gained original value as the obtained magnetic flux value, wherein the gain value is obtained by calculating a ratio of a third preset threshold to an initial value, and the initial value is the original value collected by the magnetic flux sensor when the apparatus is in an environment without external magnetic field interference and is not be pressed.

For various embodiments of the earphone device and computer-readable storage medium of the present application, reference can be made to the various embodiments of the earphone control method of the present application, which will not be described again here.

It should be noted that, in this document, the terms “comprising”, “including” or any other variations thereof are intended to cover a non-exclusive inclusion, such that a process, method, article or apparatus that comprises a series of elements not only comprises those elements, but also comprises other elements not expressly listed or inherent in the process, method, article or apparatus. Without further limitation, an element defined by the statement “comprises a . . . ” does not exclude the presence of additional identical elements in a process, method, article, or apparatus that comprises that element.

The above serial numbers of the embodiments of the present application are only for description and do not represent the advantages and disadvantages of the embodiments.

Through the above description of the embodiments, those skilled in the art can clearly understand that the methods of the above embodiments can be implemented by means of software plus the necessary general hardware platform. Of course, it can also be implemented by hardware, but in many cases the former is a better implementation. Based on this understanding, the technical solution of the present application can be embodied in the form of a software product in essence or that contributes to the existing technology. The computer software product is stored in a storage medium (such as ROM/RAM, disk, CD), comprising several instructions to cause a terminal apparatus (which can be a mobile phone, computer, server, air conditioner, or network apparatus, etc.) to execute the methods described in various embodiments of this application.

The above are only preferred embodiments of the present application, and are not intended to limit the patent scope of the present application. Any equivalent structure or equivalent process transformation made using the contents of the description and drawings of the present application may be directly or indirectly used in other related technical fields, are all equally included in the scope of patent protection of this application.

What is claimed is:

1. An earphone control method, which is applied to an earphone device, wherein the earphone device is provided with a magnet and a magnetic flux sensor therein, a separation distance between the magnet and the magnetic flux sensor is changeable by pressing the earphone device, and the earphone control method comprises:

obtaining a magnetic flux value by the magnetic flux sensor; and determining an operation type of a user on the earphone device according to the magnetic flux value, to control the earphone device according to the operation type, wherein the operation type comprises one of a click type or a long press type, and the click type comprises a single click type or a double click type.

2. The earphone control method according to claim 1, wherein the determining the operation type of the user on the earphone device according to the magnetic flux value comprises:

obtaining a reference value set currently;

counting a first duration of a state in which a difference between each of magnetic flux values continuously obtained according to a preset frequency and the reference value is greater than a first preset threshold;

if the first duration exceeds a first preset duration and is less than a second preset duration, determining that the operation type of the user on the earphone device is the click type; and if the first duration exceeds the second preset duration and is less than a third preset duration, determining that the operation type of the user on the earphone device is the long press type.

3. The earphone control method according to claim 2, further comprising:

counting a second duration of a state in which a range of each of the magnetic flux values continuously obtained according to the preset frequency is less than a second preset threshold; and if the second duration exceeds the third preset duration, setting an average value of each of the magnetic flux values whose range is less than the second preset threshold for the second duration as a new reference value.

4. The earphone control method according to claim 1, wherein the determining the operation type of the user on the earphone device according to the magnetic flux value comprises:

obtaining a preset magnetic flux range;

when the magnetic flux value is within the magnetic flux range, determining that the magnetic flux value is valid data; and determining the operation type of the user on the earphone device according to the magnetic flux value which is the valid data.

5. The earphone control method according to claim 4, wherein before the obtaining the preset magnetic flux range, the earphone control method further comprises:

when it is determined that the earphone device is in an environment without external magnetic field interference and is not be pressed, obtaining an initial magnetic flux value by the magnetic flux sensor;

calculating an initial distance between the magnet and the magnetic flux sensor based on the initial magnetic flux value;

adding a preset distance change range to the initial distance to obtain a distance range; and calculating the magnetic flux range according to the distance range.

6. The earphone control method according to claim 1, wherein the determining the operation type of the user on the earphone device according to the magnetic flux value comprises:

obtaining a preset magnetic flux range;

counting a third duration of a state in which each of magnetic flux values continuously obtained according to a preset frequency is within the magnetic flux range; and if the third duration exceeds a fourth preset duration, determining the operation type of the user on the earphone device according to each of the magnetic flux values that are in the magnetic flux range for the third duration.

7. The earphone control method according to claim 1, wherein the obtaining the magnetic flux value by the magnetic flux sensor comprises:

gaining an original value collected by the magnetic flux sensor using a gain value and using the gained original value as the obtained magnetic flux value, wherein the gain value is obtained by calculating a ratio of a third preset threshold to an initial value, and the initial value is the original value collected by the magnetic flux sensor when the apparatus is in an environment without external magnetic field interference and is not be pressed.

8. An earphone device, comprising:

a memory, a processor, and an earphone control program stored in the memory and executable by the processor, wherein, when executed by the processor, the earphone control program causes the processor to perform the earphone control method according to claim 1.

9. A non-transitory computer-readable storage medium, in which an earphone control program is stored, the earphone control program, when executed by a processor, causes the processor to perform the earphone control method according to claim 1.

10. An earphone control apparatus disposed in an earphone device, wherein the earphone device is provided with a magnet and a magnetic flux sensor therein, a separation distance between the magnet and the magnetic flux sensor is changeable by pressing the earphone device, and the earphone control apparatus comprises:

an obtaining module for obtaining a magnetic flux value by the magnetic flux sensor; and a determining module for determining an operation type of a user on the earphone device according to the magnetic flux value, to control the earphone device according to the operation type, wherein the operation type comprises one of a click type or a long press type, and the click type comprises a single click type or a double click type.

* * * * *